Nov. 24, 1931. F. H. THORPE 1,833,008
COUPLING FOR RODS AND OTHER METALLIC BODIES
Filed Jan. 3, 1928
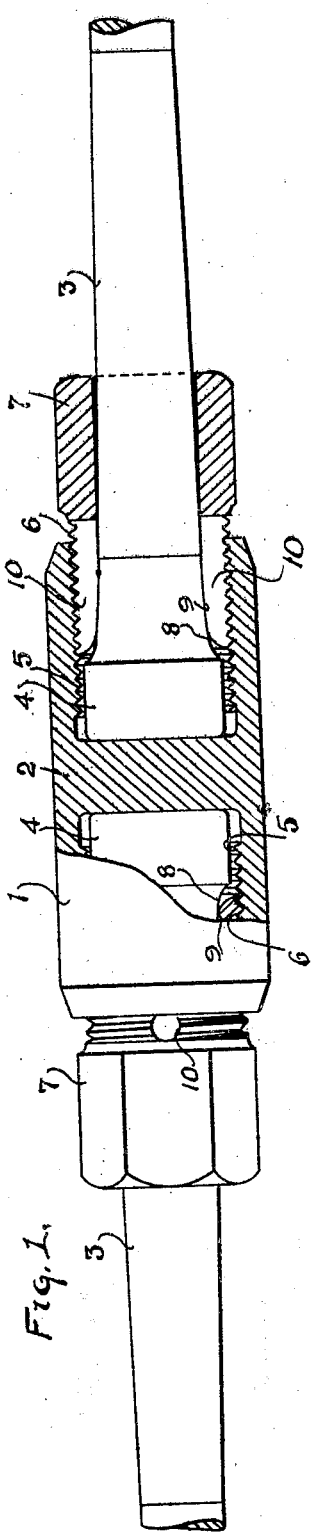
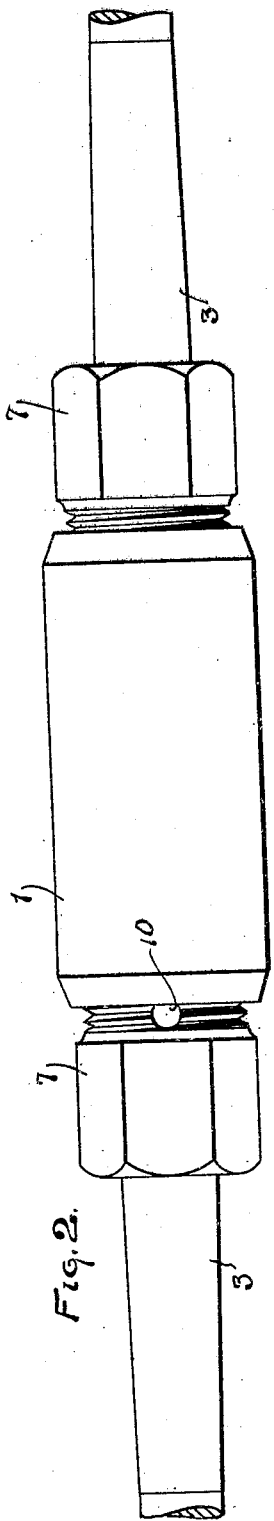
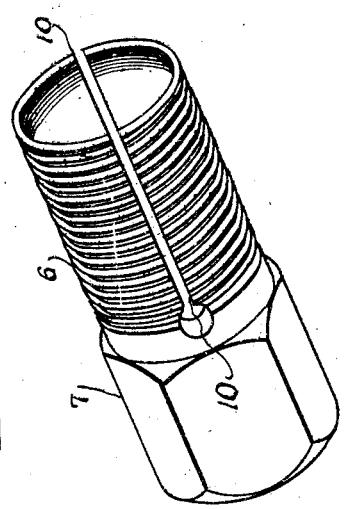
Inventor
FOREST H. THORPE
BY Toulmin Toulmin,
Attorneys Patented Nov. 24, 1931

1,833,008

UNITED STATES PATENT OFFICE

FOREST H. THORPE, OF COLUMBUS, OHIO, ASSIGNOR TO THE COLUMBUS SUCKER ROD COMPANY, OF COLUMBUS, OHIO, A CORPORATION OF OHIO

COUPLING FOR RODS AND OTHER METALLIC BODIES

Application filed January 3, 1928. Serial No. 244,185.

This invention relates to certain new and useful improvements in couplings for rods and other metallic bodies.

One of the objects of this invention is to provide a coupling of such a construction that the parts thereof will not work loose from use, as is the case with couplings now in use.

Another object of the invention is to provide a coupling of such a construction that when the same is assembled to connect two rods, the parts of the coupling will be locked together and will prevent the separation of the coupling and rods.

Another object of the invention is to provide a coupling of such a construction that the vibration of the rods will be disposed over a considerable area instead of being limited to a point adjacent the outer ends of the bushings or nuts that are used to secure the rods to the couplings as is the case with rods that are fastened together with the present construction of couplings.

Other objects of the invention will be observed from the description of my invention.

Fig. 1 is a side elevation of my improved coupling, partly in section, as applied to two rods;

Fig. 2 is a side elevation of my coupling as employed in connecting two rods; and Fig. 3 is a perspective showing my improved form of bushing or nut which I employ for securing a rod to the coupling.

In the form of my invention illustrated in the drawings, 1 is a coupling member provided with a partition 2 to form a stop for the ends of the rods 3. In the form shown in the drawings the rods 3 are provided with heads 4 that bear against the stop 2.

As shown the coupling 1 has both ends 5 internally threaded to cooperate with external threads 6 on coupling nuts or bushings 7. If desired the ends of the coupling may be externally threaded and the nuts or bushings may be internally threaded.

The rods 3 are provided with tapered portions 8 which cooperate with tapered portions 9 on the nuts or bushings 7. These nuts or bushings are slotted as shown at 10 so that the inner ends thereof can be spread apart.

As the nuts or bushings 7 are screwed into the couplings the tapered ends 9 of the nuts or bushings cooperate with the tapered portions 8 of the rods and force the ends of these nuts into tight engagement with the coupling.

Couplings of the type heretofore in use for the purpose of uniting rods, and particularly when used for connecting pump rods, frequently loosen up and permit the rods to separate. This entails a great deal of trouble, because the portion of the rod above the point of separation must be removed and then the balance must be fished out of the well. Actual test of my coupling has demonstrated that the coupling will not separate and thus all trouble experienced because of coupling separation has been eliminated. This is a matter of great importance because these pump rods are sometimes four or five thousand feet long.

Another great source of trouble from prior constructions has been caused by the pump rod breaking at the outer end of the coupling nuts or bushings. In these prior constructions the rods and nuts were made so that there would be a tight fit between them. In such construction the fatiguing or weakening of the rod, due to the constant strain placed upon it by the raising and lowering of the rod, took place at the outer end of the nut or bushing. In my construction of coupling the fatiguing of the rod is distributed over a considerable surface, and hence this trouble is eliminated. The lifting and lowering of the rods exerts a heavy pulling and pushing strain on the rod and causes the formation of crystals. This crystallization of the rod results in its breakage. This is particularly true of rods which fit snugly in the couplings. With my rod and coupling this crystallization is prevented because the clearance between the rods and couplings distributes the strains over a greater area and overcomes the tendency to crystallize. This is a matter of great importance.

It will be observed from the drawings that the rod 3 is tapered for a distance of more than half of the length of the nut 7. Of course the rod could be made straight and the nut tapered, so as to provide clearance between the rod and nut. In this way the vibration or bending of the rod takes place throughout the length of the clearance between the rod and nut, whereas in the previous constructions the bending took place at the end of the nut or bushing. The result was that the rods would snap off at the end of the coupling nut, while in my construction this trouble is eliminated. This has been a source of much trouble, and whenever it occurred, the portion of the rod left in the well, as well as the pump cylinder had to be fished out. My invention eliminates this source of trouble.

My improved coupling can also be used for various other purposes besides connecting pump rods. It could be used for connecting a tool to the coupling, for instance, instead of being used for connecting two rods together.

It will be understood that I desire to comprehend within my invention such modifications as may be necessary to adapt it to varying conditions and uses.

Having thus fully described my invention, what I claim as new and desire to secure by Letters Patent is:

1. In a coupling for rods subjected to longitudinal and lateral strains, a coupling member having a threaded hole therein, a rod having a head smaller in diameter than said hole, the surface of the rod adjacent the head being concave and the rod gradually tapering from said portion, and a second coupling member adapted to be threaded into said hole, and having a cylindrical longitudinal bore with a flared inner end to receive the rod, said flared portion engaging the concaved portion of the rod and the cylindrical portion providing a clearance between the coupling and rod of sufficient size to distribute the lateral strains over an extended area of contact between the coupling and rod.

2. In a coupling for rods subjected to lateral as well as longitudinal strains, a coupling member having an internally threaded bore, a rod having a head smaller in diameter than the diameter of said bore, a portion of the rod adjacent the head being concave, a second coupling member externally threaded and having a slot therein and adapted to be threaded into said bore, said second coupling member provided with a bore to receive said rod, said bore having a flared end to engage the concave portion of the rod, the remainder of said bore from said concave portion outwardly and the surface of said rod in said bore being constructed and arranged to provide between said parts a clearance of sufficient size to distribute the lateral strains over an extended area of contact between the coupling and rod.

In testimony whereof, I affix my signature.

FOREST H. THORPE.